United States Patent
Gross et al.

(10) Patent No.: US 11,799,856 B2
(45) Date of Patent: Oct. 24, 2023

(54) APPLICATION IDENTIFICATION

(71) Applicant: Cisco Technology, Inc., San Jose, CA (US)

(72) Inventors: David Steven Gross, Cincinnati, OH (US); Jennifer Lee Bammel, Dexter, MI (US); David William Matteson, Dexter, MI (US); Christopher Carl Cassell, Ann Arbor, MI (US); Kyle David Mills, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 17/194,000

(22) Filed: Mar. 5, 2021

(65) Prior Publication Data
US 2022/0286455 A1 Sep. 8, 2022

(51) Int. Cl.
*H04L 9/40* (2022.01)
*H04L 101/663* (2022.01)
(52) U.S. Cl.
CPC .... *H04L 63/0876* (2013.01); *H04L 2101/663* (2022.05)
(58) Field of Classification Search
None
See application file for complete search history.

(56) References Cited

U.S. PATENT DOCUMENTS

| | | | |
|---|---|---|---|
| 6,182,146 B1 * | 1/2001 | Graham-Cumming, Jr. | H04L 61/00 709/224 |
| 2013/0031254 A1 * | 1/2013 | Bhandiwad | H04L 47/34 709/225 |
| 2015/0020220 A1 | 1/2015 | Mullick et al. | |
| 2018/0218145 A1 | 8/2018 | Hussain et al. | |
| 2018/0337920 A1 * | 11/2018 | Stites | G06F 21/73 |
| 2018/0351986 A1 | 12/2018 | Johns | |
| 2020/0374280 A1 | 11/2020 | Zeng et al. | |

OTHER PUBLICATIONS

"How to check which application is using which port". Published Oct. 4, 2009 at https://veerasundar.com/blog/how-to-check-which-application-is-using-which-port/ (Year: 2009).*

Browser Detection Using the User Agent, Last Modified Dec. 23, 2020 and Downloaded Jan. 11, 2021, from MDN Web Docs Mozilla, at <<<https://developer.mozilla.org/en-US/docs/Web/HTTP/Browser_detection_using_the_user_agent>>>.

* cited by examiner

*Primary Examiner* — Scott B Christensen
(74) *Attorney, Agent, or Firm* — Lee & Hayes, P.C.

(57) ABSTRACT

This disclosure describes techniques for identifying an application (e.g., accessing application) that is attempting to access a resource. In some examples, access may be managed by an authentication service. When an access request is received at the authentication service from an application on a client device, the authentication service may ask the application to communicate with an identification agent on the client device. The identification agent may perform one or more tests to discover the identity of the application. In some cases, the identification agent may send the identity of the application to the authentication service. The authentication service may then allow or deny access by the accessing application to the resource based at least in part on the discovered identity.

20 Claims, 7 Drawing Sheets

APPLICATION IDENTIFICATION

TECHNICAL FIELD

The present disclosure relates generally to identifying an application that is attempting to access a resource and/or service over a network, thereby improving performance and/or security of the network.

BACKGROUND

A user of a client device may wish to gain access to a resource and/or service (e.g., website) via a network. A decision to grant or deny access to the client device may be based on a policy. In some examples, the policy may be based at least in part on the identity of an application that is being used by the client device to access the network. However, if the application is not correctly identified, access may be granted inappropriately, or access may be denied inappropriately. In some examples, identification of the accessing application may be difficult. For example, a user agent on the client device may incorrectly report an identity of the accessing application, or may incorrectly report other information related to the application or related to the client device. Incorrect reporting of information about the application or client device may be accidental or may be purposeful, even nefarious. Regardless, improved methods for correctly identifying an accessing application may help make more informed decisions about whether to grant access to a resource.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
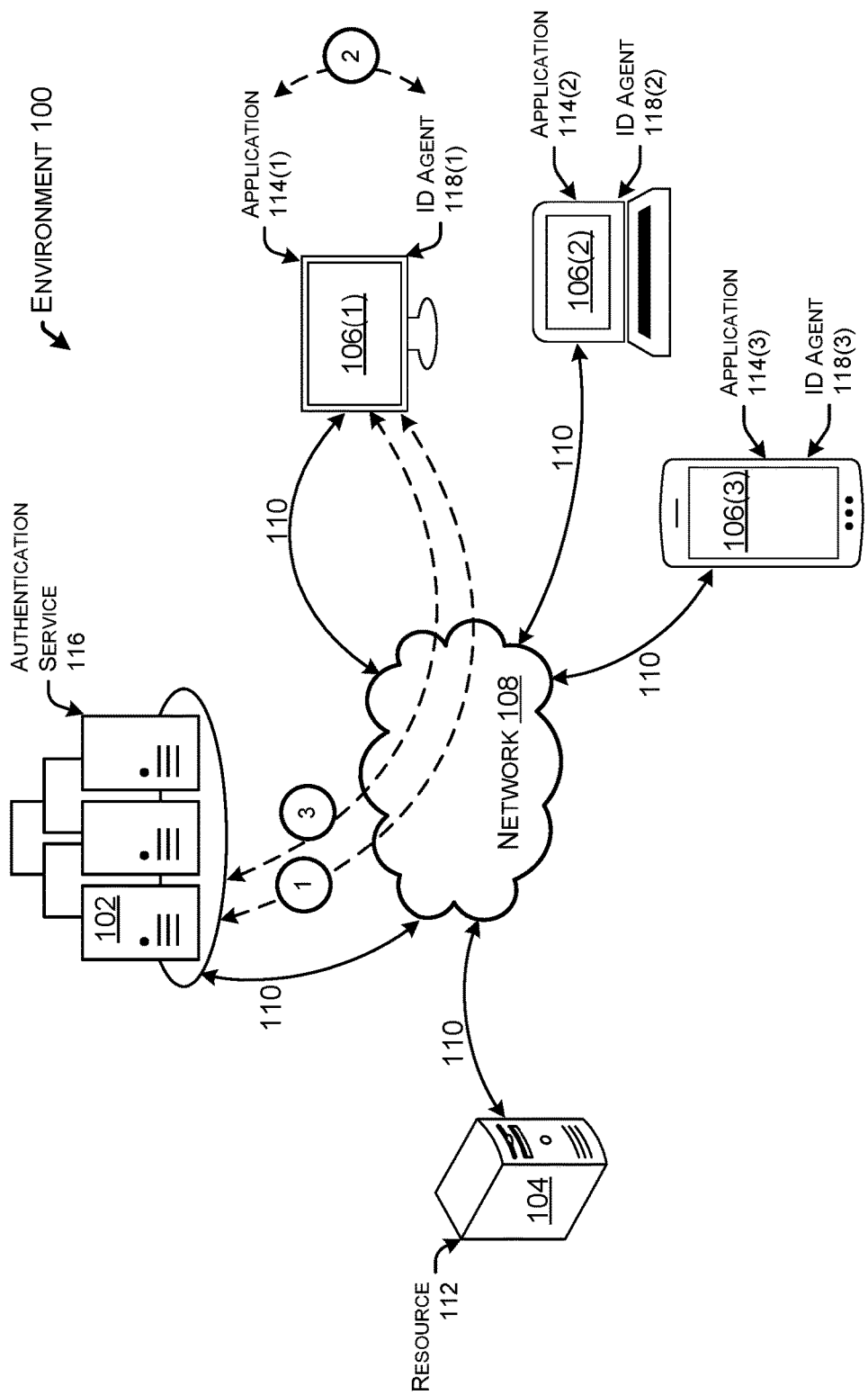
FIG. 1 illustrates a component diagram with an example environment in which application identification may be employed among devices, in accordance with the present concepts.

This disclosure describes, at least in part, a method that may be implemented by a client device communicatively coupled to network resources. The method may include receiving an identity request for an identity of an application on a client device. The identity request may be received from the application at a first port of the client device and received by an identification agent at a second port of the client device. The method may include accessing a port list that includes information regarding entities using the first port and the second port of the client device. Based at least in part on the information from the port list, the method may include determining, by the identification agent, the application that is utilizing the first port to communicate the request. The method may include sending, by the identification agent, a query for the identity of the application that is utilizing the first port. The method may also include receiving, in response to the query, the identity of the application. Finally, the method may include sending the identity of the application to an authentication service on a remote device.

This disclosure also describes, at least in part, a method that may be implemented by network resources communicatively coupled to a client device. The method may include receiving, at an authentication service and from an application on a remote client device, an access request to access a resource managed by the authentication service. The access request may be received via a first communication channel between the authentication service and the remote client device. In response to the access request, the method may include sending a directive to the application. The directive may direct the application to send an identity request for an identity of the application to an identification agent on the remote client device. The method may include receiving, at the authentication service and from the identification agent, the identity of the application, wherein the identity is received via a second communication channel between the authentication service and the remote client device. Based at least in part on the identity of the application, the method may include making, by the authentication service, an access determination regarding whether to allow the application to access to the resource. Further, the method may include sending, to the application at the remote client device, a response to the access request, the response based at least in part on the access determination.

Additionally, the techniques described herein may be performed by a system and/or device having non-transitory computer-readable media storing computer-executable instructions that, when executed by one or more processors, performs the method described above.

Example Embodiments

This disclosure describes techniques for identifying an application (e.g., accessing application) that is attempting to access a resource and/or service, such as a website. In some examples, access may be managed by an authentication service. When an access request is received at the authentication service from an application on a client device, the authentication service may ask the application to communicate with an identification agent on the client device. The identification agent may perform one or more tests regarding the accessing application and/or the client device. Through the one or more tests, the identification agent may discover the identity of the accessing application. In some cases, the identification agent may send the discovered identity to the authentication service. The authentication service may then allow or deny access by the accessing application to the resource based at least in part on the discovered identity.

In some examples, a user may wish to log in to a resource that is available over a network. As used herein, "resource" may represent a wide variety of services or entities that may require authentication and/or authorization to access. For example, a resource may be a website or cloud service with which the user has a user account. The user account may have associated login and/or password information with which the user may authenticate in order to gain access to the user account. For security or management purposes, the resource may establish a relationship with an authentication service purpose to help authenticate and/or authorize users attempting to access the resource. In some cases, an authentication service may be a multiple factor authentication service (e.g., a dual-authentication service). For example, the user may provide the login and/or password information for the user account, and the authentication service may provide an additional level of authentication and/or authorization before determining that a user should be allowed or denied access to the resource. The additional authentication/authorization may include investigating an identity of the application with which the user is attempting to gain access to the resource. Additionally, the authentication service may learn other information about a client device with which the user is attempting access, collect further information from the user (e.g., biometrics), etc.

For illustration purposes, consider that a user with a client device intends to login to a resource at a remote device. The user utilizes an application on the client device to initiate the login request. The user may enter login and/or password information to attempt to login to a user account. The "application" may be any of a variety of applications that can be used to access a resource. An application could include various types of web browsers, embedded browsers, and/or native applications on the user device. For example, an application may include a browser running "under the hood," of the application. As such, the identity or nature of the particular software that is attempting to access the resource may be relatively obscure and/or complicated. The application may not be required to report an identity of the application, or may report some other aspect of the application while the identity of the particular portion that is requesting access remains obscure. Previously, when web browser was being used as an authentication application, the only way to enforce policy around that application was to use the user-agent HTTP header that the embedded browser provided. The techniques described herein makes use of a separate process to map the access request to an identifier that divulges a true identity of the application, outside of what is reported by the user-agent. The example applications described herein are not meant to be limiting.

When the user attempts to login to the resource, the request may be sent to the authentication service at some point in the login process. The request may or may not be routed to or through a device associated with the resource before arriving at the authentication service. Regardless, once the request (or notice of the request) arrives at the authentication service, a communication channel is established between the client device of the user and the authentication service. The authentication service may be located at a particular device (e.g., server) or may potentially be represented by multiple devices. For instance, the authentication service may be cloud-based, providing authentication (and/or authorization, etc.) services through multiple networked cloud computing resources.

In order to make an informed decision regarding allowing or denying access by the client device to the resource, the authentication service may send instructions to the application on the client device to communicate with an identification agent. The identification agent may be software and/or code located on the client device. The identification agent may be a partner and/or extension of the authentication service. In response to the request, the application may communicate with the identification agent. The identification agent may perform one or more tests to assist the authentication service with identification of the accessing application and/or collecting or discovering other information that may help the authentication service to determine whether to allow or deny access to the resource. The tests may include a variety of queries or other methods of acquiring information about the accessing application and/or the client device in general. For example, once communication between the application and the identification agent is established, the identification agent may learn a port (e.g., port ID, port number) through which the application is communicating. The identification agent may use the port ID to look up an identity of the application that is running on that port ID. In this manner, the identification agent may learn the identity of the application without relying on the application to truthfully divulge the identity to either the identification agent or the authentication service. Therefore, the identification agent may be more resistant to spoofing by an application than other methods that rely on information presented or offered by the application (e.g., presented by a user agent).

Once the identification agent has discovered the identity of the application, the identification agent may report the identity and/or other information about the application (e.g., version) and/or about the client device (e.g., operating system) to the authentication service. The identification agent may open a separate channel to communicate with the authentication service. The authentication service may then be able to make a better-informed decision about whether to allow or deny access to the resource. For instance, the authentication service may apply a policy in the decision-making process. The policy may stipulate that certain applications may be used to access the resource, while others should be prevented from being used to access the resource. Since the identity of the application was learned by the identification agent without relying on the application to truthfully divulge the identity, and the identification agent communicated the identity to the authentication service separately (not through the application), the authentication service may be able to more successfully apply the policy. Therefore, security for the resource is improved, through an identification process that is more robust to tricking or fooling, or simply being presented with incorrect information.

To summarize, a more robust technique for identifying an application that requests access to a resource may improve network security and/or operations. The techniques described herein include using an identification agent located on a client device that is able to discover the identity of an application, without relying on the application to truthfully divulge its identity. The identification agent may be enacted with relatively low overhead and/or low draw on computing resources. In some examples, the identification agent may be viewed as a lightweight mechanism for improving security, featuring both relatively low computational cost and relatively low bandwidth usage. Furthermore, improved decisions regarding allowing or denying access to a resource may help reduce the future cost(s) of inappropriately allowing or denying access, such as the cost to retroactively deny access or resolve access for entities that should have been allowed into the resource.

Although the examples described herein may refer to an identification agent on a client device as the central point of application identification, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present application identification concepts. Example environment 100 may include network resources 102 (e.g., cloud-based resources), a server device 104, and/or client devices 106 (e.g., user devices). Network resources 102 may include any of a variety of computing resources such as server devices, applications, databases, storage devices, networks, other computing devices, etc. These computing resources may be viewed as being remote from a client device 106 and/or a server device 104, and therefore may be referred to simply as one or more remote devices. In FIG. 1, three client devices 106 are depicted, including client device 106(1), client device 106(2), and client device 106(3). Herein, parentheticals are utilized after a reference number to distinguish like elements. Use of the reference number without the associated parenthetical is generic to the element. As such, a client device 106 may represent any of a variety of computing devices of a user, such as a computer, laptop, mobile device, tablet, smart watch, etc.

In example environment 100, network resources 102, server device 104, client devices 106, and/or other devices may be communicatively coupled to each other via network 108 (e.g., cloud computing network). Within the example environment 100, server device 102, network resources 104, client devices 106, and/or other devices may exchange communications (e.g., packets) via a network connection(s) to network 108, indicated by double arrows 110. For instance, network connections 110 may be transport control protocol (TCP) network connections or any network connection (e.g., information-centric networking (ICN)) that enables the server device 102 to exchange packets with other devices via network 108. The network connections 110 represent, for example, data paths between the server device 102, network resources 104, and client devices 106. It should be appreciated that the term "network connection" may also be referred to as a "network path." Also, the data may pass through one or more other network devices (e.g., router, switch) on any path between the server device 102, network resources 104, and/or client devices 106. The suggestion of a cloud computing network(s) relative to the example environment in FIG. 1 is not meant to be limiting. Other types of networks are contemplated in accordance with application identification concepts.

In some examples, any of client devices 106 may try to access a resource 112 (e.g., website) at server device 104. For example, a user of client device 106(1) may wish to log on to a website at server device 104. Server device 104 may host and/or control access to the website and/or other resource. The client device 106(1) may use an application 114(1) to attempt access to the resource 112 at server device 104. In some cases, the resource 112 may use an authentication service 116 located at network resources 102 to help determine whether to allow or deny access by the application 114(1). Further, the authentication service 116 may utilize an identification (ID) agent 118(1) on client device 106(1) to help discover information about the application 114(1) and/or the client device 106(1). The authentication service 116 may then be able to use any discovered information, such as an identity of application 114(1), to make a decision regarding allowing or denying access to the resource 112. For instance, the authentication service 116 may apply a policy (e.g., software-based policy) to the identity of application 114(1) to grant or deny access.

FIG. 1 illustrates example communications between network resources 102, authentication service 116, client device 106(1), application 114(1), and/or identification agent 118 (1) in accordance with the present application identification concepts. The communications are indicated with dashed, numbered lines. For example, the communication(s) at "Step 1" may include client device 106(1) using application 114(1) to communicate with network resources 102 regarding accessing resource 112. Step 1 may also represent authentication service 116 (and/or network resources 102) communicating with application 114(1) to establish communication with identification agent 118(1). As a result, at "Step 2," application 114(1) may communicate with identification agent 118(1). Also at Step 2, identification agent 118(1) may collect information and/or perform tests to help discover information about application 114(1). Identification agent may or may not communicate with other entities or components of client device 106(1) to collect information regarding application 114(1) or client device 106(1). In some examples, when identification agent 118(1) discovers an identity of application 114(1) and/or other information about application 114(1) and/or client device 106(1), at "Step 3" identification agent 118(1) may communicate any of the information to authentication service 116. Additional detail regarding potential communications between authentication service 116, an identification agent 118, and/or an application 114 will be provided relative to the examples illustrated in FIGS. 2 and 3, below.

Figure 2:
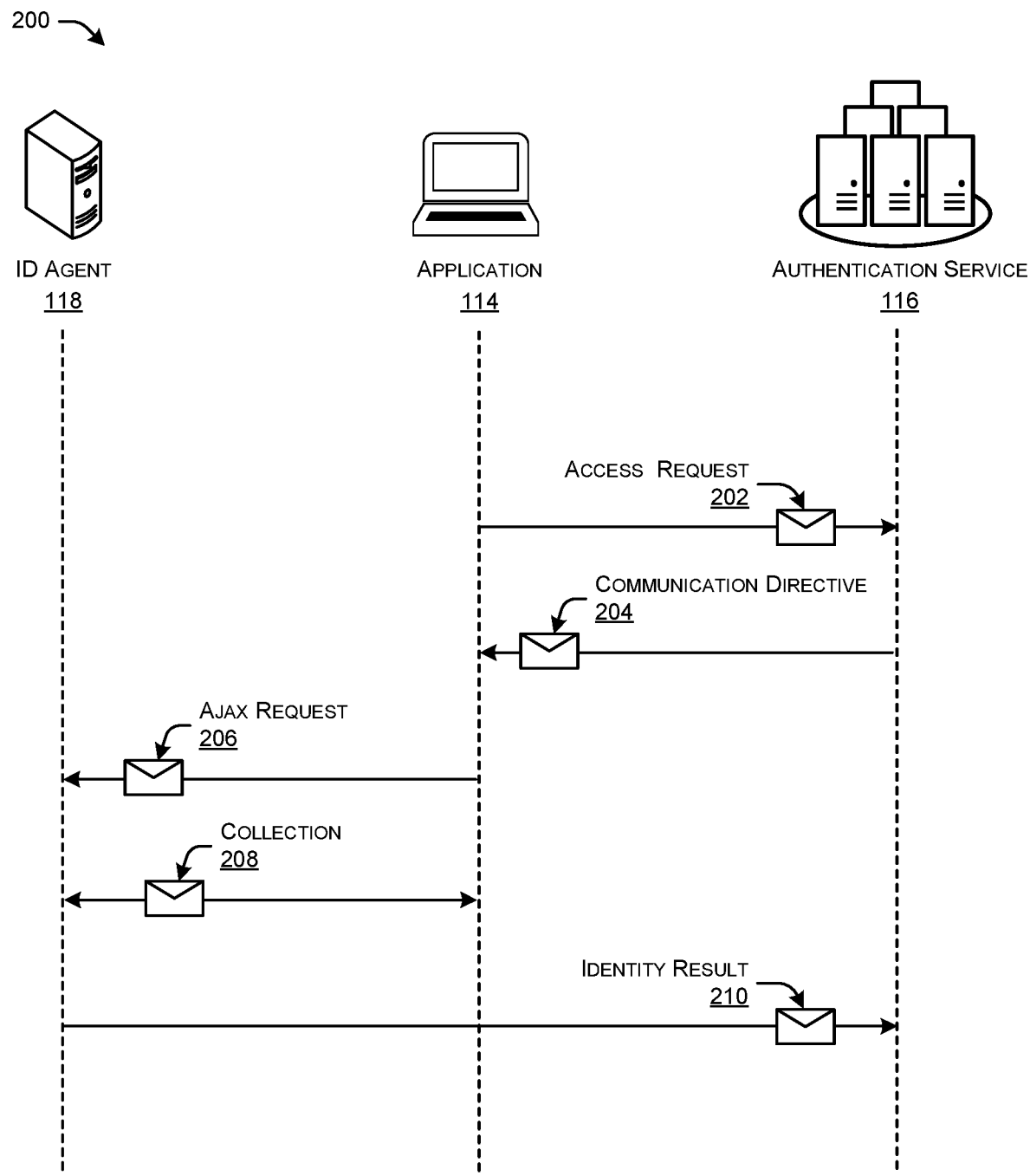
FIGS. 2 and 3 illustrate example diagrams of communications that devices of FIG. 1 may exchange in order to perform application identification techniques, in accordance with the present concepts.

FIG. 2 illustrates an example diagram 200 of communications that entities described relative to FIG. 1 may exchange to perform application identification techniques. For example, diagram 200 may represent a call flow between at least some of the devices and/or applications of FIG. 1. FIG. 2 includes authentication service 116 (at network resources 102), an identification agent 118 (at client device 106), and an application 114 (also at client device 106).

At 202 of FIG. 2, authentication service 116 may receive an access request from application 114. As suggested above, the access request may come more or less directly from client device 106 to authentication service 116, may be forwarded from another entity (such as the server device 104 that offers the resource 112 (FIG. 1)), or authentication service 116 may receive some other indication that application 114 on client device 106 wishes to access the resource 112 at server device 104.

At 204 of FIG. 2, authentication service 116 may communicate with application 114. The communication may represent an open channel or other connection between authentication service 116 and application 114. The communication may include a request and/or other directive for application 114 to communicate with identification agent 118. For example, authentication service 116 may offer a hypertext markup language (HTML) document to application 114. The HTML document may include code that directs application 114 to communicate with identification agent 118, which is also located on client device 106. For instance, the code may direct application 114 to send a hypertext transfer protocol (HTTP) request, an Asynchronous JavaScript And XML (Ajax) request, or some other communication (e.g., WebSocket) to identification agent 118.

At 206 of FIG. 2, application 114 may communicate with identification agent 118. In this example, application 114 sends an Ajax request to identification agent 118. Application 114 may communicate with identification agent 118 via a first open port within client device 106. Identification agent 118 may receive the communication via a second open port of client device 106.

At 208 of FIG. 2, identification agent 118 may continue to communicate with application 114 (and/or with other elements of client device 106) as part of a collection phase of the application identification process, to collect and/or check information about application 114 and/or other elements of client device 106. The collection phase may represent one or more tests, queries, and/or responses. Identification agent 118 may use application program interfaces (APIs) to make one or more tests or queries, for instance. In some examples, identification agent 118 may be able to access a list (e.g., port list, table, database) of open ports (e.g., ports in use, active ports) of client device 106, or otherwise find out which ports of client device 106 are being used for communication, and/or which ports are communicating with each other. For instance, identification agent 118 may query an IPv4 TCP connection table using a loopback IP address as both the remote and local address. Identification agent 118 may further narrow down the results by considering the source and destination ports (first and second ports). In a case where the narrowed results match the result from the IPv4 TCP connection table, the application 114 using the source port (first port) has been located. Identification agent 118 may then make a system call to retrieve a process identification (PID) of the application 114. Identification agent 118 may use the PID to send a query requesting the name of application 114 using the PID, leaving identification agent 118 with the true identity of application 114 that made the access request. In other examples of the collection phase of the application identification process, identification agent 118 may further learn the version of application 114, an operating system of client device 106, whether client device 106 employs a firewall, etc. The information may be related to network and/or device security, general health, operating performance, and/or various other aspects of application 114 and/or client device 106.

In some cases, aspects and/or an order of a call flow may be based at least in part on an operating system of client device 106. For purposes of illustration, the description of the collection phase of step 208 provided above may correspond to an example where the operating system of client device 106 is Windows (Microsoft). For comparison, the description of step 208 provided below may correspond to an example where the operating system of client device 106 is macOS (Apple Inc.) or Linux.

At 208 of FIG. 2, in another example, identification agent 118 may retrieve the PID by an alternative method. In this example, identification agent 118 may also make use of system calls to retrieve the PID. However, identification agent 118 may get a list of all running processes by PID. Identification agent 118 may filter out those processes without a PID at all (i.e., the PID is 0 in the query result). Identification agent 118 may further filter down the list by finding a process that has an open communication with a port of the identification agent 118 showing as both the source and destination port, so that the logic arrives at the PID of application 114. In a case where the application 114 in question is still ambiguous, identification agent 118 may use additional operating system APIs in order to inspect a parent process of application 114. Additional operating system APIs may allow identification of ambiguous cases. For instance, Apple Safari may initially look identical to other applications using embedded WebKit views, until an additional inspection is performed.

At 210 of FIG. 2, identification agent 118 may communicate with authentication service 116. For example, identification agent 118 may send an HTTP request and/or use a HTTPS connection to talk to authentication service 116. The communication between identification agent 118 and authentication service 116 may represent a second open channel or other connection. In other words, the communication between identification agent 118 and authentication service 116 may represent a second communication channel between client device 106 and network resources 102 that is separate from the first communication channel between authentication service 116 and application 114. As such, authentication service 116 can trust the information it receives from identification agent 118, since the information is not routed through a potentially untrusted entity (e.g., application 114). Authentication service 116 knows to associate the communication from the identification agent 118 with the access request received from application 114. Identification agent 118 may send information to the authentication service 116, such as the identity of application 114 and/or other information about application 114 and/or client device 106. Authentication service 116 is therefore enabled to make a better-informed decision regarding allowing or denying the access request from application 114. Authentication service 116 may also save the identity or other information. In some examples, authentication service 116 may overwrite previously received identity information, such as an identity reported by a user-agent, since the identity received from identification agent 118 is expected to be more accurate.

Figure 3:
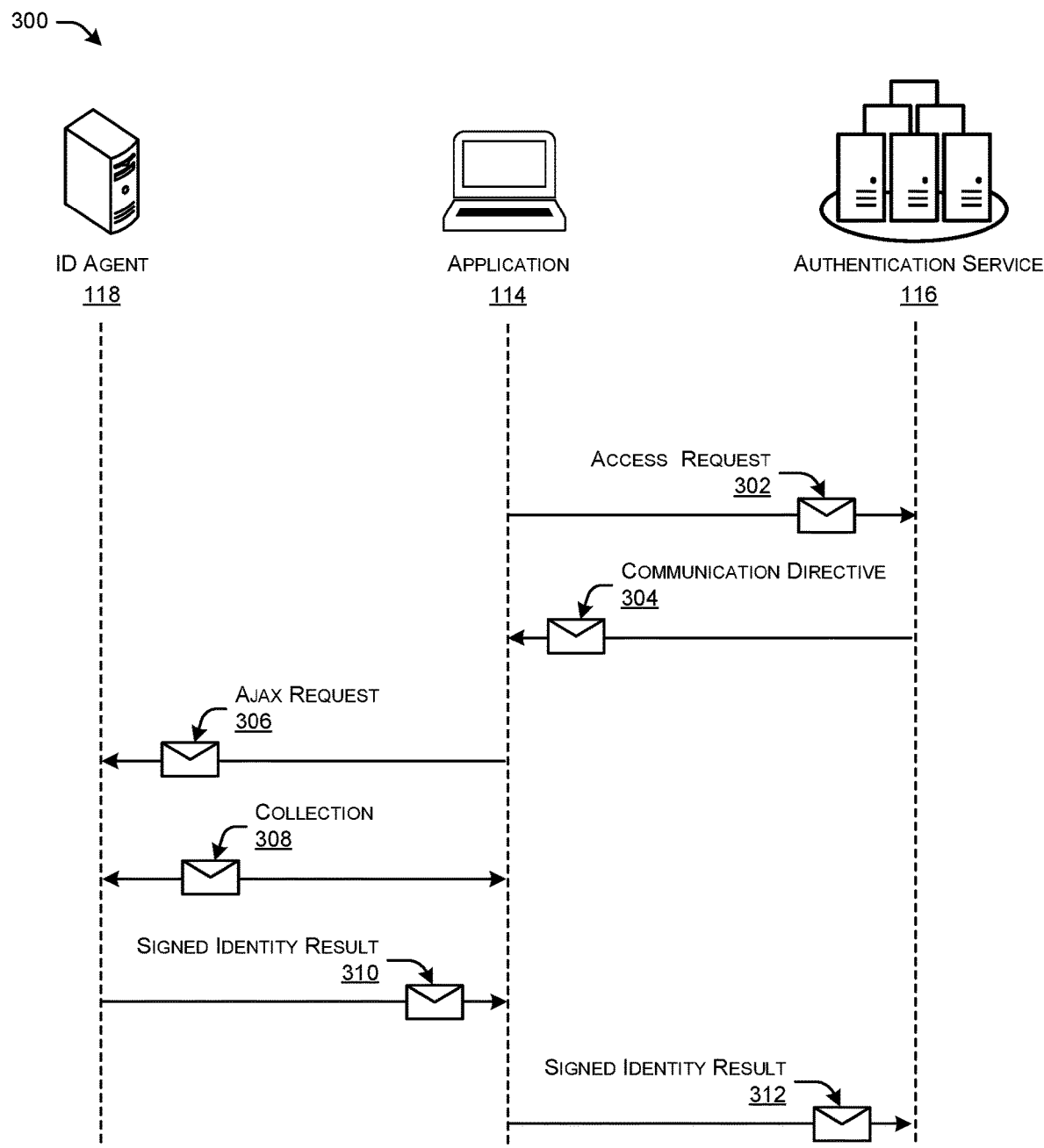

FIG. 3 illustrates an additional example diagram 300 of communications that devices of FIG. 1 may exchange to perform application identification techniques. Some aspects of the example communications shown in FIG. 3 may be similar to aspects of the example communications described above relative to FIG. 2. Therefore, for sake of brevity, not all elements of FIG. 3 will be described in detail. For example, steps 302-308 of FIG. 3 may be considered similar to Steps 202-208 of FIG. 2.

FIG. 3 illustrates an alternative method by which the identity of application 114 and/or other information is returned to authentication service 116 from identification agent 118. In FIG. 3, rather than the identity result being sent directly from identification agent 118 to authentication service 116 by a new channel or other connection, the identity result is passed through application 114. However, to prevent application 114 from changing the result, for example to hide the identity, identification agent 118 may sign the message so that authentication service 116 knows to trust the identity. At 310 identification agent 118 sends the signed identity result to application 114. At 312 application 114 forwards the signed identity result to authentication service 116. Since the message is signed by identification agent 118, authentication service 116 knows to trust the identity of application 114 contained in the message. Forwarding the identity result through application 114 may prevent the need to establish a separate connection between identification agent 118 and authentication service 116.

Other variations of application identification techniques are contemplated. For example, some of the decision-making regarding allowing or denying access to the resource could be enabled in identification agent 118. Stated another way, identification agent 118 could be "smarter," able to contribute to the decision-making process. A potential benefit could be determining that further information may need to be collected for a well-informed decision to be made, and identification agent 118 could initiate collecting additional, targeted information. In another example variation, identification agent 118 could monitor various applications and/or software used at client device 106 over time. When an access request is presented, identification agent 118 could determine whether the requesting application is regularly used at client device 106, or unusual for use at client device 106. A policy governing allowing or denying access may be written to specify that an unusual application may be considered more suspicious, and may indicate that the access should be denied.

To summarize, the application identification techniques described herein may enable accurate identification of software that is attempting access a resource. The techniques may be relatively lightweight, featuring low computational cost and/or low bandwidth usage. Even when an HTTP user-agent reports indistinguishable and/or erroneous values, the present techniques utilize operating system APIs to accurately identify the requesting software. After the identity collection phase, which is swift and not system-resource intensive, the information may be relayed back to authentication service which can then more accurately apply access policy before allowing a user to authenticate. More appropriate control of access to resources can help prevent further undue computational cost and/or bandwidth usage, improving performance of the entities involved. Therefore, application identification techniques may improve security and/or performance of network resources.

Figure 4:
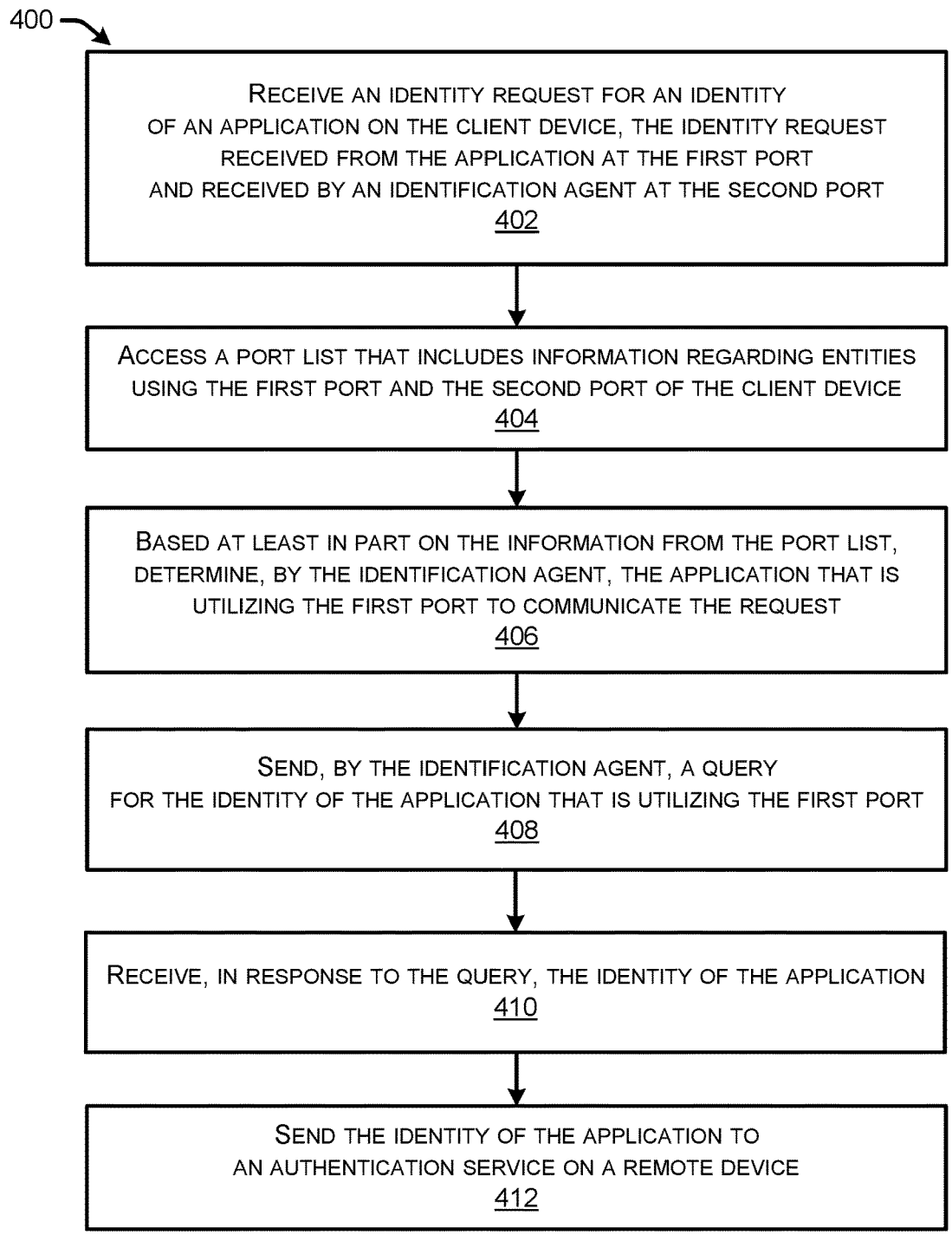
FIGS. 4 and 5 illustrate flow diagrams of example methods for application identification among devices, in accordance with the present concepts.
Figure 5:
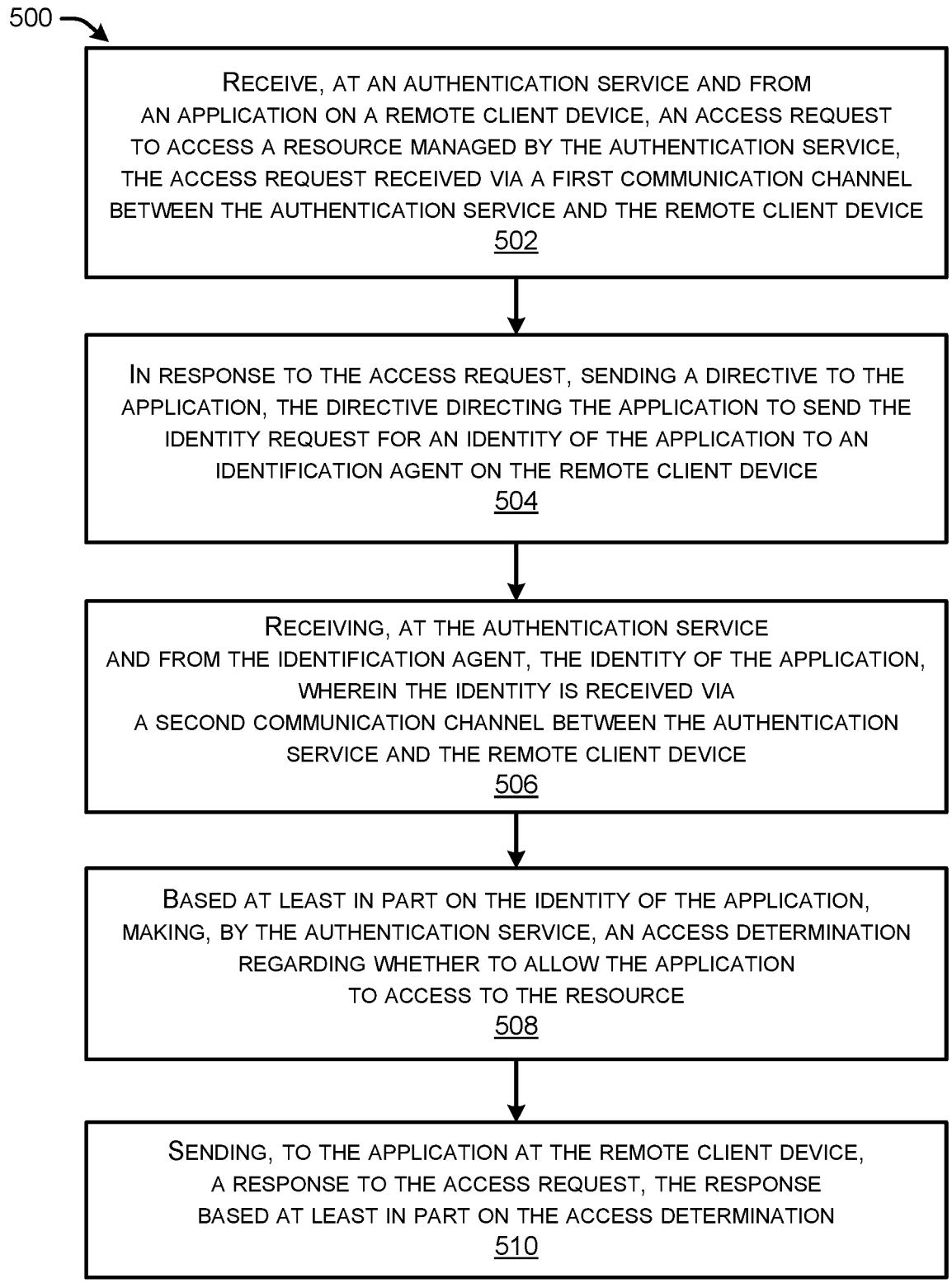

FIGS. 4 and 5 illustrate flow diagrams of example methods 400 and 500 that include functions that may be performed at least partly by a client device and/or network resources, such as client devices 106 and/or network resources 102 described relative to FIG. 1. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 4 and 5 and described herein. These operations may also be performed in parallel, or in a different order than those described herein. Some or all of these operations may also be performed by components other than those specifically identified. Although the techniques described in this disclosure are with reference to specific devices, in other examples, the techniques may be implemented by less devices, more devices, different devices, or any configuration of devices and/or components.

FIG. 4 illustrates a flow diagram of an example method 400 for a network device to perform application identification techniques. Method 400 may be performed by a client device (e.g., client device 106) communicatively coupled to network resources (e.g., network resources 102) and/or other devices, for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving an identity request for an identity of an application on a client device. In some examples, the identity request may be received from the application at a first port of the client device. Also, the identity request may be received by an identification agent at a second port of the client device. The identity request may be received at the application in response to an earlier action by the application. For example, the application may have initiated communication with an authentication service at a remote device by sending an access request to the authentication service. The access request may correspond to a resource managed by the authentication service. For instance, the authentication service may manage access to the resource for a separate server device that hosts or owns the resource. In some examples, in response to the access request, the authentication service may send a directive to the application, directing the application to send the identity request for the identity of the application to the identification agent on the client device. The authentication service may be interested in the identity of the application in order to determine whether to grant or deny access to the resource, for instance. The identity request for the identity of the application may be an HTTP request, an Ajax request, and/or some other form of communication request and/or invitation sent from the application to the identification agent, in compliance with the directive from the authentication service, for instance.

At 404, method 400 may include accessing a port list that includes information regarding entities that may be using the first port and the second port of the client device. In some examples, the port list may be a transport control protocol (TCP) connection table that includes information regarding which ports of the client device are in use, are connected in communication, and/or which entity is using any given port.

At 406, based at least in part on the information from the port list, method 400 may include determining, by the identification agent, the application that is utilizing the first port to communicate the request. In some examples, the identification agent may initiate a system call. In response to the system call, the identification agent may receive a process identification (PID) of the application. The PID may be used by the identification agent to gather further information regarding the application.

At 408, method 400 may include sending, by the identification agent, a query for the identity of the application that is utilizing the first port. In some examples, the query may be based on the PID of the application received in response to the system call.

At 410, in response to the query, method 400 may include receiving the identity of the application. The identity of the application may include a browser identity of a browser. The browser may have been used to communicate between the application and the authentication service. For instance, the browser may have sent the access request to the authentication service.

At 412, method 400 may include sending the identity of the application to the authentication service, which may be located on a remote device. The identity of the application sent to the authentication service may include the browser identity, a version of the browser, and/or other information regarding the application or the client device, such as an operating system of the client device, etc.

FIG. 5 illustrates a flow diagram of an example method 500 for network devices to perform application identification techniques. Method 400 may be performed by network resources (e.g., network resources 102) communicatively coupled to a client device (e.g., client device 106) and/or other devices, for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include receiving, at an authentication service offered via the network resources and from an application on a remote client device, an access request. The access request may indicate that a user of the client device wishes to access a resource managed by the authentication service. In some examples, the access request may be received via a first communication channel between the authentication service and the remote client device.

At 504, in response to the access request, method 500 may include sending a directive to the application. The directive may direct the application to send an identity request for an identity of the application to an identification agent on the remote client device.

At 506, method 500 may include receiving, at the authentication service and from the identification agent, the identity of the application. The identity of the application may include a browser identity of a browser that is used to communicate between the remote client device and the authentication service. The identity may include additional information in some cases, such as a version of the browser. In some examples, the identity may be received via a second communication channel between the authentication service and the remote client device.

At 508, based at least in part on the identity of the application, method 500 may include having the authentication service make an access determination regarding whether to allow the application to access to the resource. In some examples, the access determination may be performed by applying a policy. For instance, the policy may consider the identity of the application in determining whether to allow or deny access to the resource by the application. Additionally, the authentication service may store the identity of the application within the network resources, which may be useful to the authentication service for future reference. In some cases, the authentication service may overwrite previously received identity information corresponding to the application. For instance, a previously received identity of the application may have been received from a user-agent associated with the application, and therefore may be less trusted than the identity received from the identification agent.

At 510, method 500 may include sending a response to the access request from the authentication service to the application at the remote client device based at least in part on the access determination. For instance, the response may include an indication that access to the resource is allowed or denied. In some examples, the response may include further communication regarding a login process for the client device to access the resource. In other examples, the authentication service may send the indication that access to the resource is allowed or denied to a server device that hosts the resource, rather than to the client device. Additionally or alternatively, the authentication service may simply proceed with facilitating access by the client device to the resource, without sending an indication of the access determination.

Figure 6:
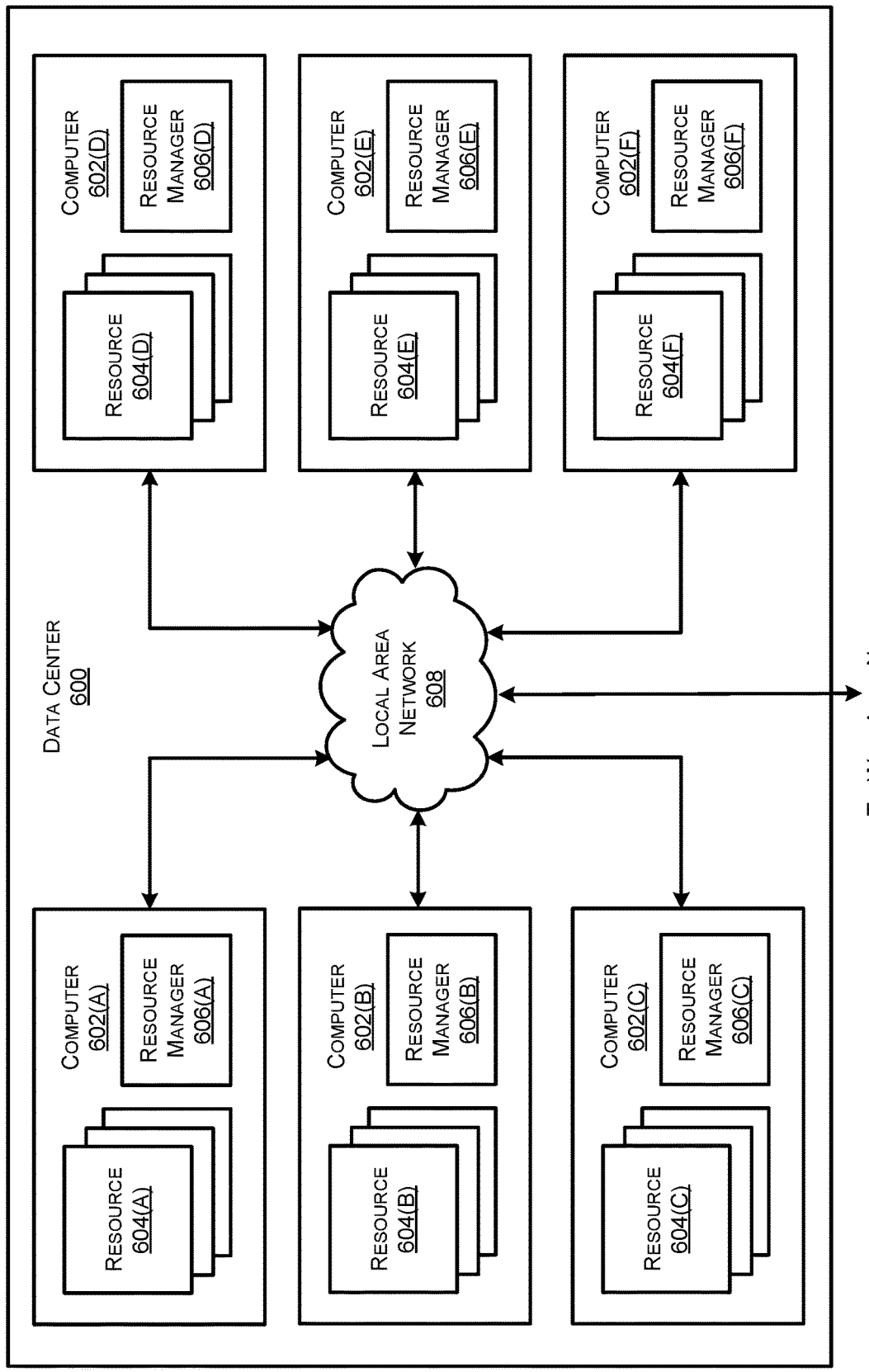
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as a network resources (102), network 108, and/or server device (104). Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in network 108 and/or network resources 102.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
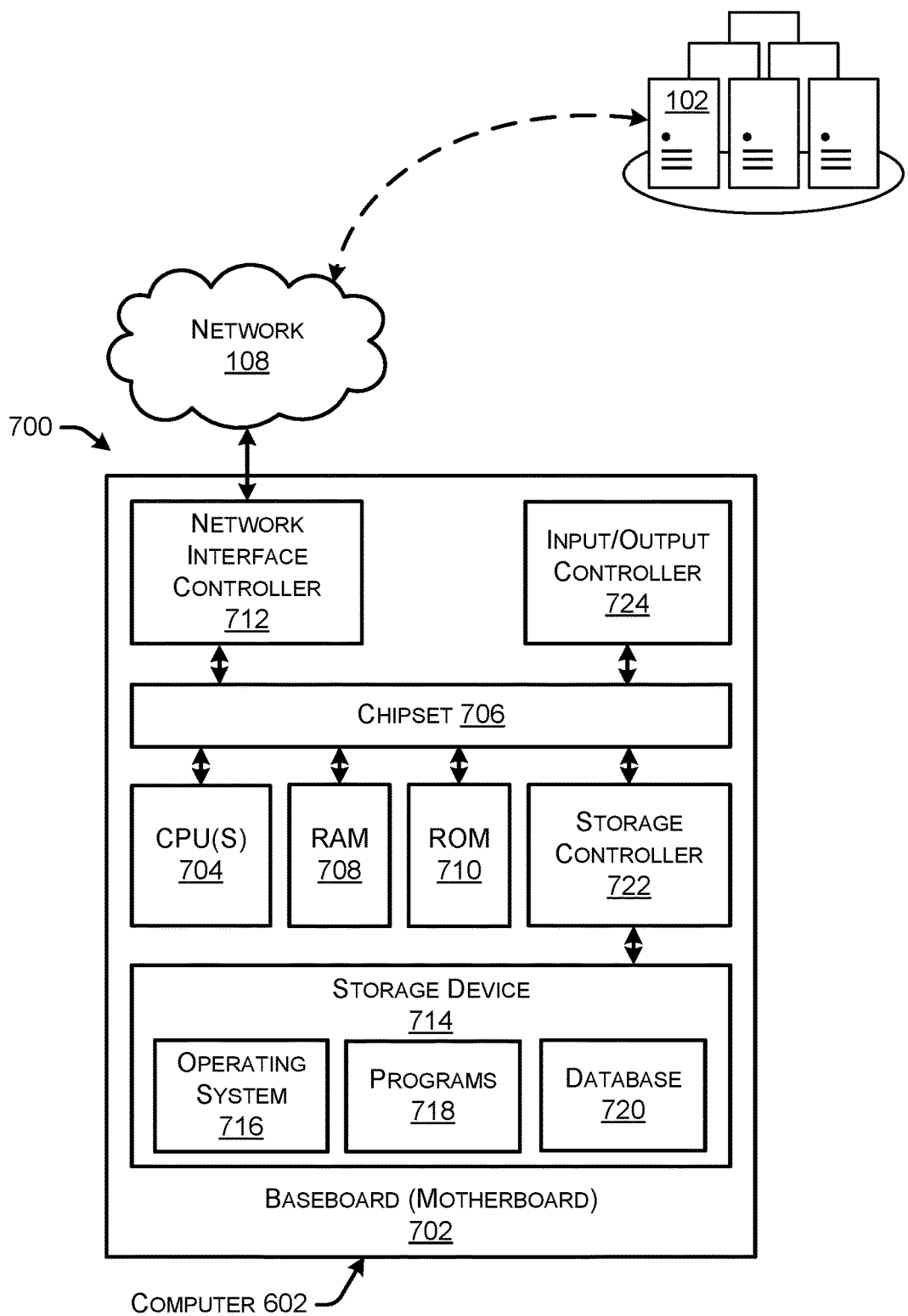
FIG. 7 is a computer architecture diagram showing an illustrative computer hardware architecture for implementing a device that can be utilized to implement aspects of the various technologies presented herein.

FIG. 7 shows an example computer architecture 700 for a computer 602 capable of executing program components for implementing the functionality described above. The computer architecture 700 shown in FIG. 7 illustrates a conventional server computer, workstation, desktop computer, laptop, tablet, network appliance, e-reader, smartphone, and/or other computing device, and can be utilized to execute any of the software components presented herein. The computer 602 may, in some examples, correspond to a physical device described herein (e.g., server device, user device, router, etc.), and may comprise networked devices such as servers, switches, routers, hubs, bridges, gateways, modems, repeaters, access points, etc. For instance, computer 602 may correspond to client device 106, network resources 102, and/or server device 104.

As shown in FIG. 7, the computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 108 and/or 608. The chipset 706 can include functionality for providing network connectivity through a network interface controller (NIC) 712, such as a gigabit Ethernet adapter. The NIC 712 is capable of connecting the computer 602 to other computing devices over the network 108. For instance, in the example shown in FIG. 7, NIC 712 may help facilitate transfer of data, packets, and/or communications over the network 108 between client device 106 and network resources 102. It should be appreciated that multiple NICs 712 can be present in the computer 602, connecting the computer to other types of networks and remote computer systems.

The computer 602 can be connected to a storage device 714 that provides non-volatile storage for the computer. The storage device 714 can store an operating system 716, programs 718, and/or other data, such as a port list, TCP connection table, application identity information, etc. The storage device 714 can be connected to the computer 602 through a storage controller 722 connected to the chipset 706, for example. The storage device 714 can consist of one or more physical storage units. The storage controller 722 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 714 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 714 is characterized as primary or secondary storage, and the like.

For example, the computer 602 can store information to the storage device 714 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 714 by detecting the physical states or characteristics of one or more particular locations within the physical storage units.

In addition to the mass storage device 714 described above, the computer 602 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 602. In some examples, the operations performed by the network 108, and or any components included therein, may be supported by one or more devices similar to computer 602. Stated otherwise, some or all of the operations performed by the network 108, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 714 can store an operating system 716 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 714 can store other system or application programs and data utilized by the computer 602.

In one embodiment, the storage device 714 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more devices, such as client device 106, server device 104, network resources 106, and/or other devices. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by client device 106, network resources 102, and/or other devices. In some examples, the communications may include data, packet(s), request(s), response(s), and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 718 may comprise any type of programs or processes to perform the techniques described in this disclosure in accordance with application identification techniques. For instance, the programs 718 may cause the computer 602 to perform techniques for communicating with other devices or among elements of a device using any type of protocol or standard usable for determining connectivity. Additionally, the programs 718 may comprise instructions that cause the computer 602 to perform the specific techniques for application identification.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
receiving an identity request for an identity of an application on a client device, the application sending the identity request using a first port on the client device and an identification agent receiving the identity request at a second port on the client device;
accessing a port list that lists entities using the first port and the second port of the client device;
identifying the identity of the application based at least in part on the port list and at least in part on the application using the first port;
sending, by the identification agent, a query for identity information of the application that is utilizing the first port;
receiving, in response to the query, the identity information of the application; and
sending the identity information of the application to an authentication service on a remote device.

2. The computer-implemented method of claim 1, further comprising:
sending, from the application on the client device and to the authentication service on the remote device, an access request for a resource managed by the authentication service; and
in response to the access request, receiving, by the application and from the authentication service, a directive directing the application to send the identity request for the identity of the application to the identification agent on the client device.

3. The computer-implemented method of claim 2, wherein the identity request for the identity of the application is a hypertext transport protocol (HTTP) request sent from the application to the identification agent.

4. The computer-implemented method of claim 1, wherein the port list is a transport control protocol (TCP) connection table.

5. The computer-implemented method of claim 1, further comprising:
initiating a system call, by the identification agent; and
in response to the system call, receiving, by the identification agent, a process identification (PID) of the application.

6. The computer-implemented method of claim 5, wherein the query for the identity information of the application sent by the identification agent is based on the PID of the application received in response to the system call.

7. The computer-implemented method of claim 1, wherein the identity information of the application includes a browser identity of a browser used to communicate between the application and the authentication service.

8. The computer-implemented method of claim 7, wherein the identity information of the application sent to the authentication service on the remote device includes the browser identity and a version of the browser.

9. A client device comprising:
at least a first port and a second port;
one or more processors; and
one or more non-transitory computer-readable media storing computer-executable instructions that, when executed by the one or more processors, cause the one or more processors to:
receive an identity request for an identity of an application on the client device, the application sending the identity request using the first port and an identification agent receiving the identity request at the second port;
access a port list that lists entities using the first port and the second port of the client device;
identify the identity of the application based at least in part on the port list and at least in part on the application using the first port;
send, by the identification agent, a query for identity information of the application that is utilizing the first port;
receive, in response to the query, the identity information of the application; and
send the identity information of the application to an authentication service on a remote device.

10. The client device of claim 9, wherein the computer-executable instructions further cause the one or more processors to:
send, from the application and to the authentication service on the remote device, an access request for a resource managed by the authentication service; and
in response to the access request, receive, by the application and from the authentication service, a directive directing the application to send the identity request for the identity of the application to the identification agent on the client device.

11. The client device of claim 10, wherein the identity request for the identity of the application is an Ajax request sent from the application to the identification agent.

12. The client device of claim 9, wherein the port list is a transport control protocol (TCP) connection table.

13. The client device of claim 9, wherein the computer-executable instructions further cause the one or more processors to:
initiate a system call, by the identification agent; and
in response to the system call, receive, by the identification agent, a process identification (PID) of the application.

14. The client device of claim 13, wherein the query for the identity information of the application sent by the identification agent is based on the PID of the application received in response to the system call.

15. The client device of claim 14, wherein the identity information of the application includes a browser identity of a browser used to communicate between the application and the authentication service.

16. The client device of claim 15, wherein the identity information of the application sent to the authentication service on the remote device includes the browser identity and a version of the browser.

17. A method comprising:
receiving an identity request for an identity of an application on a client device, the application sending the identity request using a first port on the client device and an identification agent receiving the identity request at a second port the client device;
accessing a port list that lists entities using the first port and the second port of the client device;
identifying the identity of the application based at least in part on the port list and at least in part on the application using the first port;
sending, by the identification agent, a query for identity information of the application that is utilizing the first port; and
receiving, in response to the query, the identity information of the application.

18. The method of claim 17, further comprising:
sending, from the application on the client device and to an authentication service on a remote device, an access request for a resource managed by the authentication service; and
in response to the access request, receiving, by the application and from the authentication service, a directive directing the application to send the identity request for the identity of the application to the identification agent on the client device.

19. The method of claim 17, further comprising:
initiating a system call, by the identification agent; and
in response to the system call, receiving, by the identification agent, a process identification (PID) of the application.

20. The method of claim 19, wherein the identity information of the application includes a browser identity of a browser used to communicate between the application and an authentication service.

* * * * *